Patented Feb. 22, 1927.

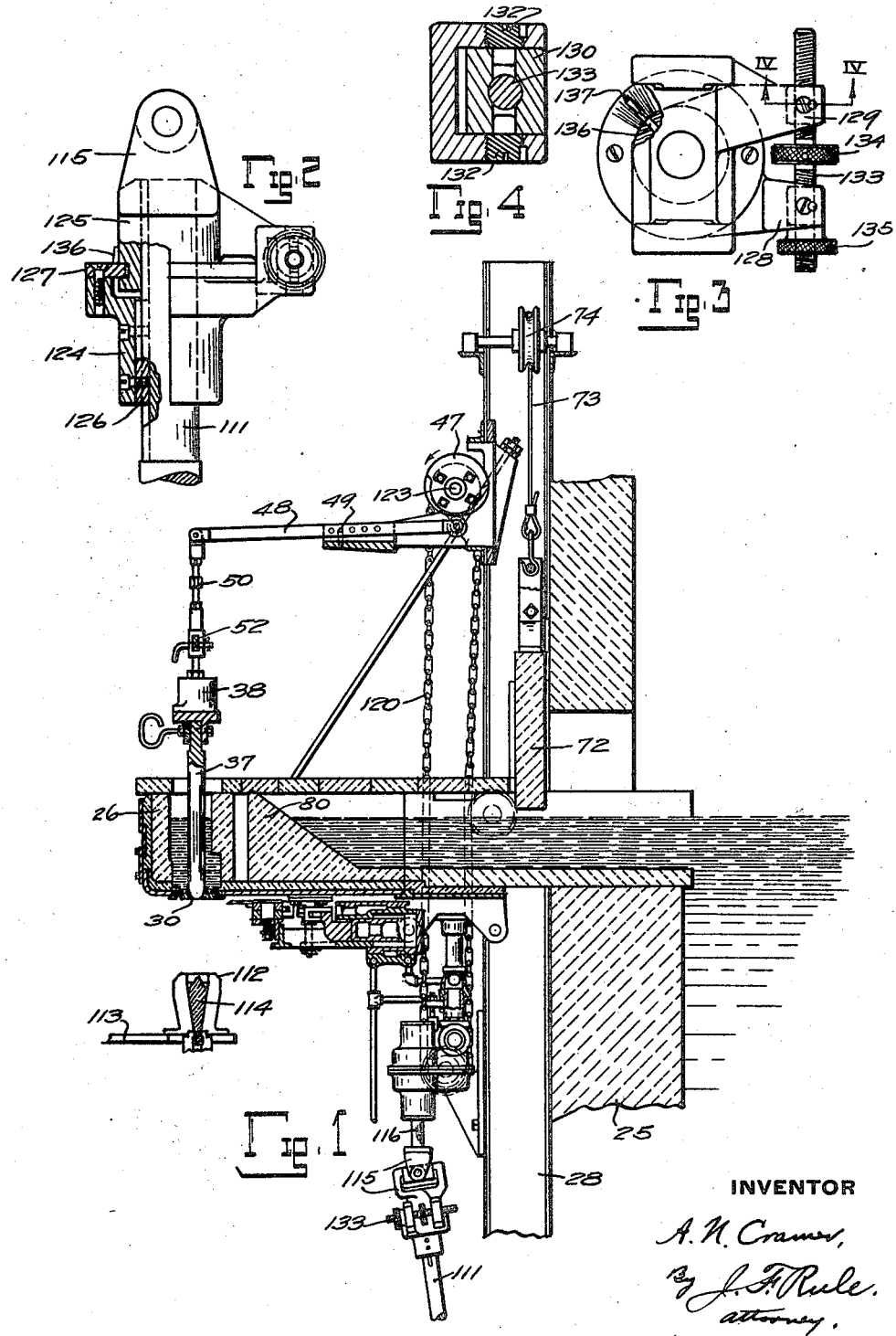

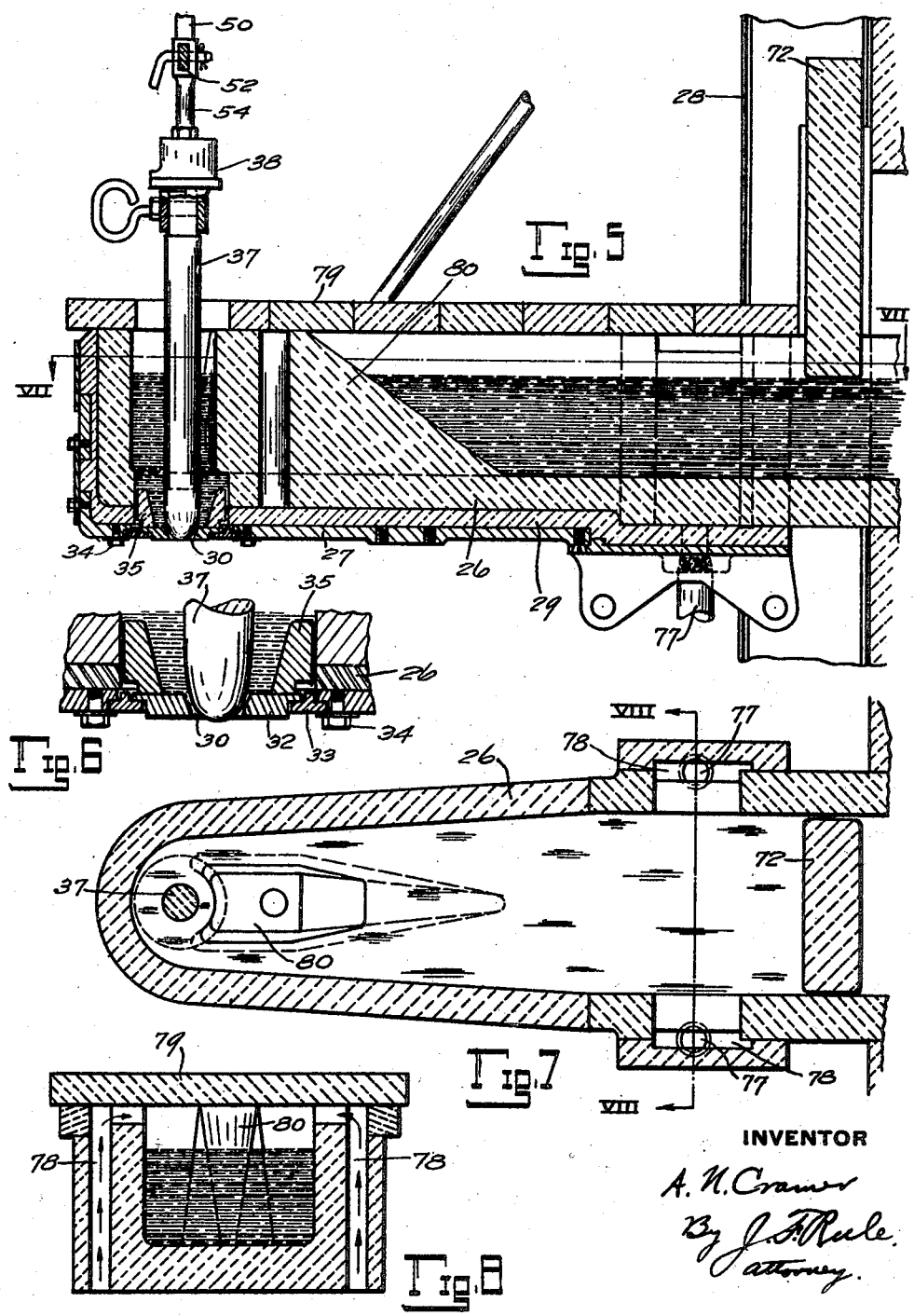

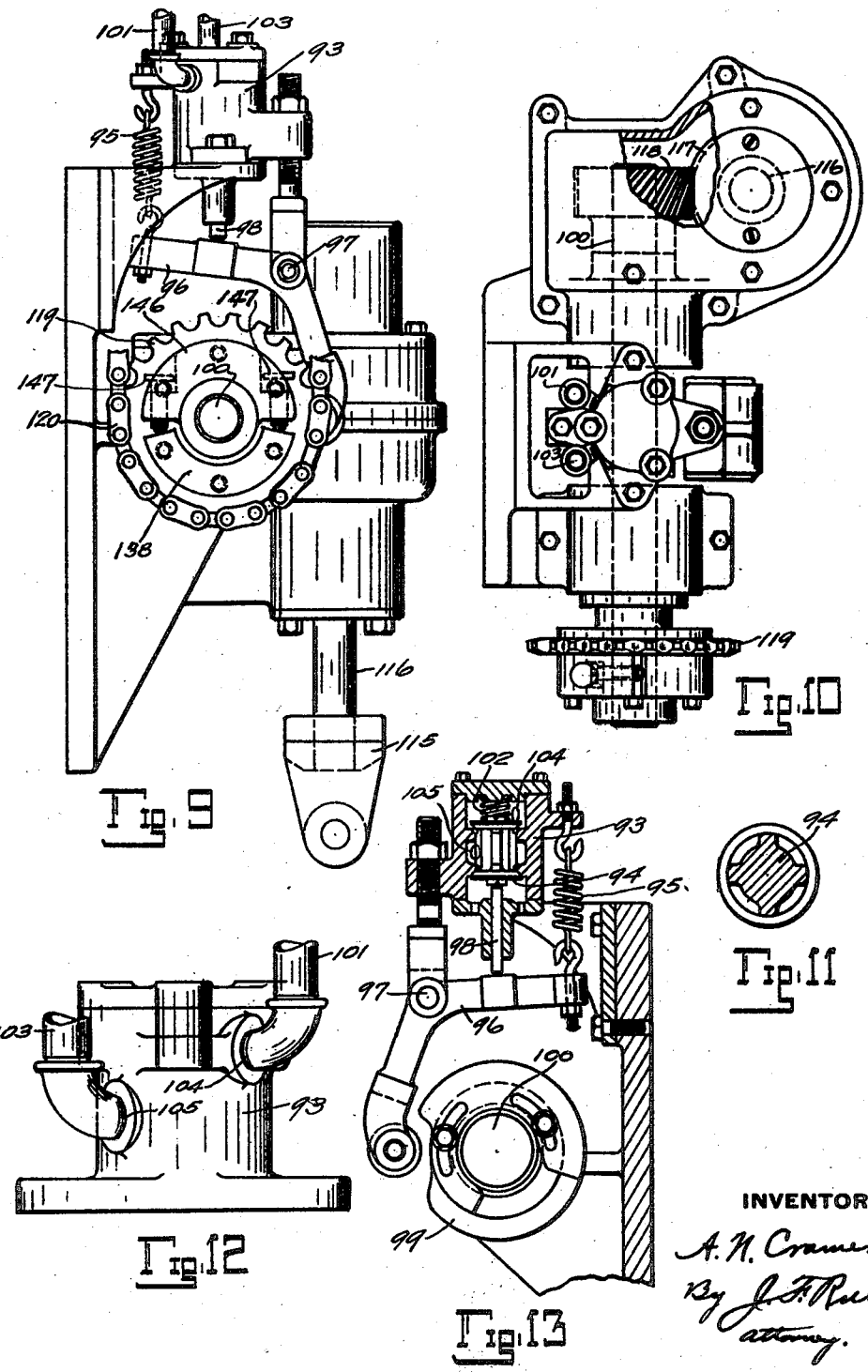

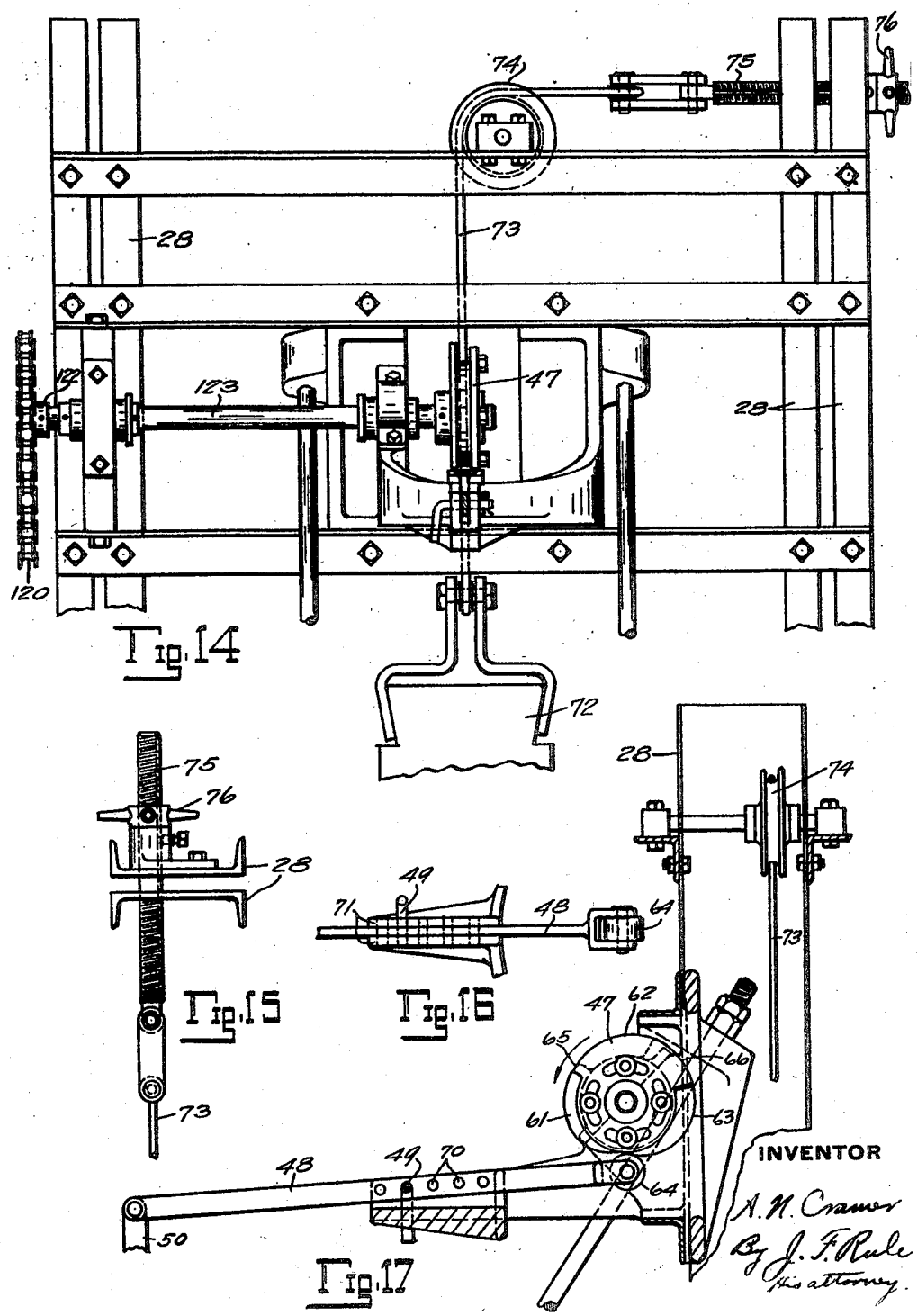

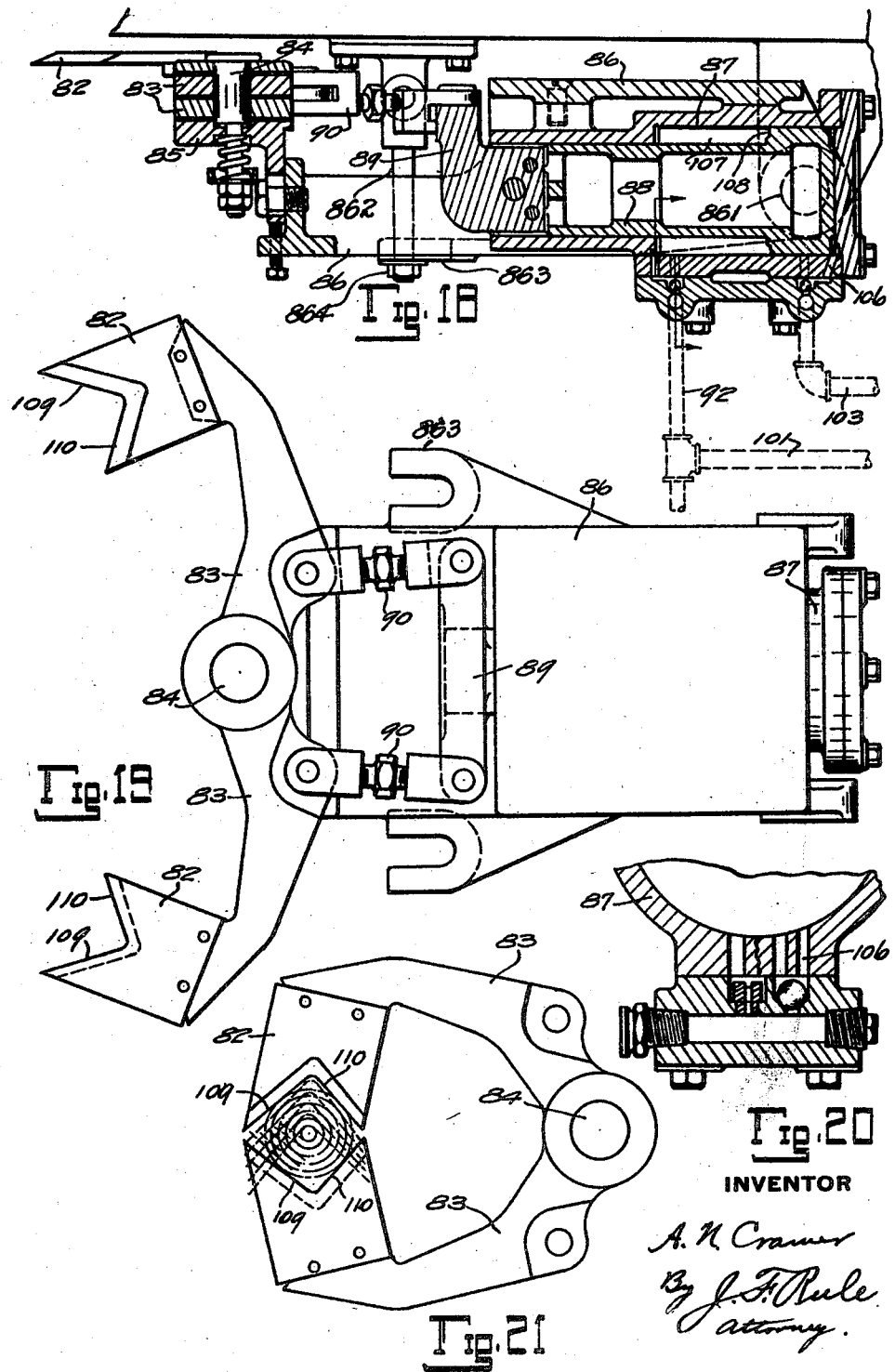

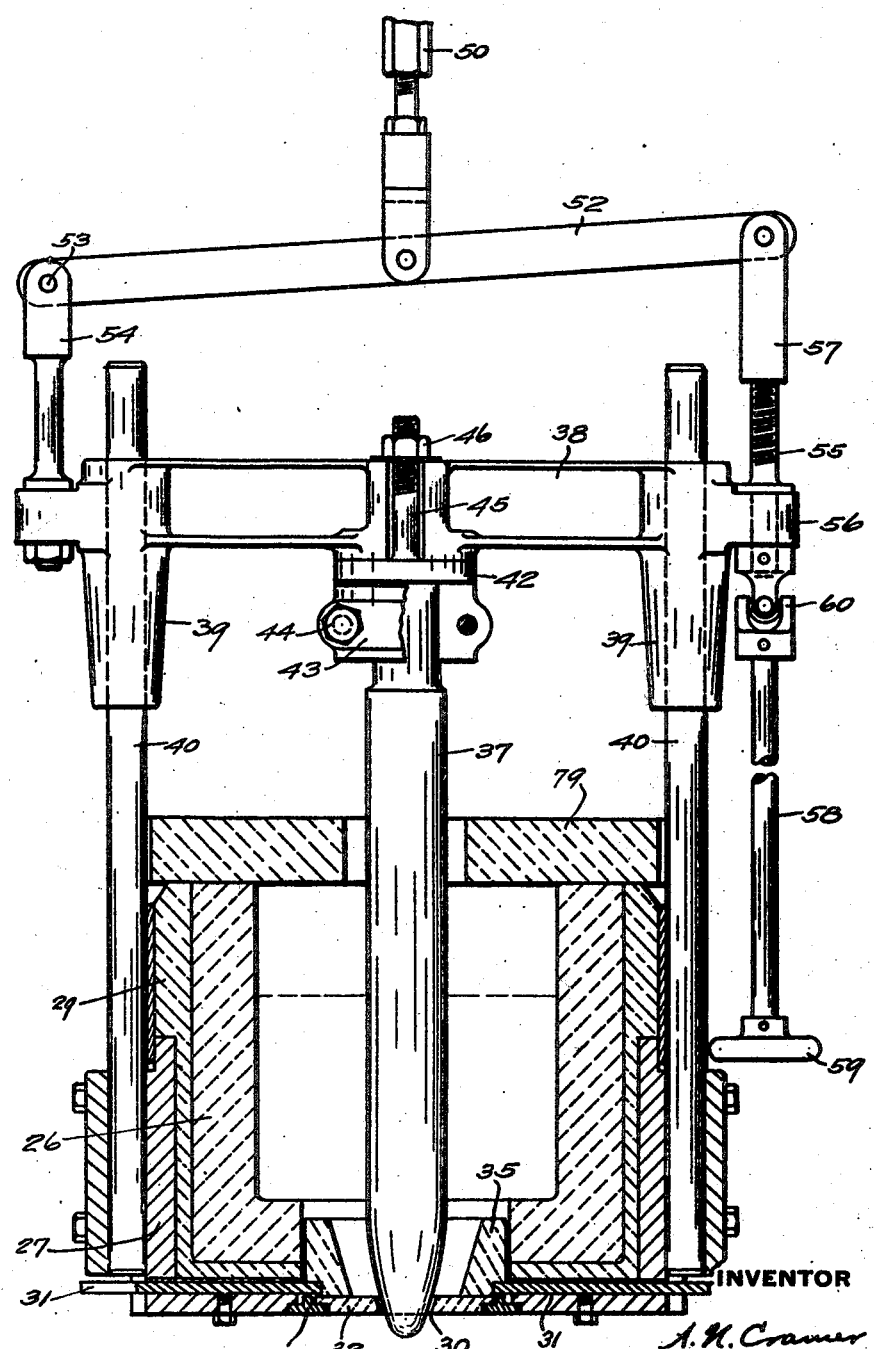

1,618,271

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FEEDING MECHANISM.

Application filed February 23, 1921. Serial No. 447,238.

My invention relates to apparatus for supplying molten glass from a tank or furnace, and shaping and separating the glass into individual masses or gobs which form charges for the molds of a glass shaping machine.

The apparatus in its preferred form comprises a boot or chamber extending from the main furnace tank, the floor of the boot being a short distance below the level of the glass in the tank and having an outlet orifice in the bottom thereof through which the glass is discharged. A plunger arranged to reciprocate vertically in the glass above the outlet, assists in controlling the discharge and in shaping the suspended masses or gobs of issuing glass. The gobs are severed a short distance below the orifice by shears operated in synchronism with the movements of the plunger.

Among the objects of the invention are to provide improved means to adjust the plunger up and down while the apparatus is in operation; an improved adjustable cam for regulating and timing the movements of the plunger; and improved means for adjusting and regulating the timing of the several operations relative to each other and relative to the glass forming machine or machines with which the feeder is used. The precise nature of these improvements will be more fully set forth hereinafter.

Other objects of the invention will appear hereinafter.

In the accompanying drawings:

Figure 1 is a sectional elevation of an apparatus embodying my invention.

Figure 2 is a detail part sectional elevation of adjustable means in the driving connection between the forming machine and feeder mechanism for timing the feeder relative to said machine.

Figure 3 is a plan view of the same.

Figure 4 is a section at the line IV—IV on Figure 3.

Figure 5 is a sectional elevation showing the boot and plunger.

Figure 6 is an enlarged detail showing the removable bushings forming the outlet orifice.

Figure 7 is a section at the line VII—VII on Figure 5.

Figure 8 is a section at the line VIII—VIII on Figure 7.

Figure 9 is an elevation showing a timer for the cutter operating motor.

Figure 10 is a plan view of the same.

Figure 11 is a section through the valve shown in Figure 13.

Figure 12 is an elevation view of the upper part of Figure 9, viewed in a direction at right angles to that of Figure 9.

Figure 13 is a sectional elevation showing the timing valve controlling the shear operating motor.

Figure 14 is a front elevation of the apparatus above the boot.

Figure 15 is a plan view of the valve gate adjusting means shown in Figure 14.

Figure 16 is a detail showing the adjustable fulcrum for the plunger operating lever.

Figure 17 is a fragmentary view showing said lever and its operating cam.

Figure 18 is a sectional elevation through the shear mechanism.

Figure 19 is a plan view of the same.

Figure 20 is a detail showing ports at one end of the shear motor.

Figure 21 is a diagrammatic view illustrating the operation of the shears.

Figure 22 is a sectional elevation showing the plunger and adjusting means therefor.

Referring particularly to Figures 1 to 8 inclusive, the molten glass flows from the furnace tank 25 into a boot 26 extending from the wall of the furnace adjacent the level of the glass. The boot is made of fire clay and is supported on a cast iron frame 27 attached to vertical I-beams 28. Asbestos or other insulating material 29 may be interposed between the frame 27 and the floor and walls of the boot. An outlet opening 30 is provided in the bottom of the boot adjacent the outer end thereof. This opening is formed in a clay bushing 32 held in position by a metal ring 33 which in turn is held by removable bolts 34. By removing the bolts 34 the bushing 32 may be quickly removed and replaced by a new bushing. Above the bushing 32 is a clay ring 35 which is also removable but independently held by slide bars 31 (Fig. 22).

The discharge of the glass through the orifice 30 is regulated and controlled by a plunger or plug 37 which is automatically reciprocated periodically over the outlet. The plunger is carried by a yoke 38 (Fig. 22) formed with sleeves 39 which are slidable up and down on standards 40 projecting upward from the frame 27. The connection between the plunger and the yoke comprises a clamping block 42 including a removable section 43 and clamping bolts 44. A stem 45 projects upward from said block through an opening in the yoke 38 and is held by a nut 46.

The plunger is reciprocated by a cam 47 operating through a lever 48 having a fulcrum 49. The lever 48 has an adjustable connection 50 with a bar 52 (Fig. 22). This bar is connected at one end by a pivot 53 to a post 54 on one end of the yoke 38. An adjustable connection between the other end of the bar 52 and yoke comprises a rod 55 swiveled in a lug 56 on the yoke and having a screw threaded connection with a link 57 pivoted to the bar 52. A rod 58 provided with a hand wheel 59 has a universal joint connection 60 to the post 55. By rotating the hand wheel 59, the bar 52 is adjusted toward or from the yoke, thereby adjusting the plunger up or down. It will be noted that the handle 59 may be swung to any convenient position, permitting the plunger readily to be adjusted while the apparatus is in operation.

The cam 47 (see Fig. 17) comprises independently adjustable sections 61, 62 and 63 which control the movements of the plunger. The cam is rotated continuously in a counterclockwise direction, as indicated by the arrow. The section 61 depresses the roll 64 on the lever 48 and thereby moves the plunger upward. A rest portion 65 permits the plunger to remain stationary for a brief interval while in an intermediate position. The cam section 62 then causes a continued upward movement of the plunger to its uppermost position at which it remains while the rest portion 66 of the cam traverses the roll 64. The cam section 63 then operates to permit the plunger to move downward. This downward movement is effected by the weight of the plunger and connected parts. The initial upward movement, caused by the cam section 61, may be more rapid than the movement due to the cam section 62.

A complete mold charge or gob of glass is discharged for each complete reciprocation of the plunger. The discharge of the glass is interrupted or restricted while the plug is in its lowered position. The upward movement of the plug exerts an upward pull on the glass, which has a more or less pronounced effect in controlling the flow, depending on the position and speed of the plug and the condition of the glass. As the plunger moves downward, it exerts an expelling force on the issuing glass and thereby accelerates the discharge and assists in forming a gob or mass depending from the walls of the orifice. The plunger in its downward movement operates to maintain the full diameter of the column or gob of glass instead of permitting it to draw out to an attenuated stream as it would without the plunger. After the plunger is lowered, the gob is severed by a pair of shears as hereinafter described.

The fulcrum pin 49 (Figs. 16 and 17) for the lever 48 is adjustable to different positions along the lever. For this purpose the lever is provided with a series of holes 70. The flanges 71 between which the lever 48 is located are provided with corresponding openings.

A valve gate 72 is arranged to project downward into the boot adjacent the furnace wall and thereby restricts the size of the opening between the boot and the main furnace. This gate is supported by a cable 73 which passes over a sheave 74 and is attached to an adjusting rod 75 on which is threaded a hand wheel 76. By rotating the hand wheel, the gate is lifted or lowered. Said gate forms a partition wall between the furnace and the boot and permits the temperature in the boot to be regulated and controlled. Air for reducing the temperature of the glass in the boot may be admitted through pipes 77 (Figs. 5, 7, 8) which communicates with air channels 78 extending vertically through the side walls of the boot and opening into the boot just beneath the roof 79 thereof.

An island or dividing wall 80 is provided in the boot and serves to divide the flow of glass and cause it to approach the outlet opening from opposite sides. The purpose of this arrangement is to cause a more uniform distribution of the flow of glass through the outlet. Without such provision, the glass on the side of the plunger remote from the furnace becomes colder than the glass nearer the furnace. As a result, the glass is colder at one side of the gob than the other, causing a defect in the finished ware. Also, the gob is drawn to one side instead of depending vertically from the orifice during its formation.

The shearing mechanism will now be described: This comprises a pair of shear blades 82 attached to shear arms 83 fulcrumed on a pivot pin 84. This pin is supported on a bracket 85 adjustably mounted on a supporting frame 86 which is directly beneath the boot. The frame 86 is pivotally connected at 861 to the framework of the boot and is supported adjacent its forward end by bolts 862 extending through lugs 863 on the frame 86. By removing the nuts 864, the shear mechanism can be swung down, to permit the shears to be changed or other adjustments to be made.

The shears are operated by an air motor comprising a cylinder 87 in which reciprocates a hollow piston 88, to the forward end of which is attached a yoke 89 connected through adjustable links 90 to the shear arms 83. The motor is operated by air under pressure supplied through a pressure pipe 92 connected to a constant source of pressure. The operations of the motor are controlled and timed by a timer valve 94 in a valve casing 93, the movements of the valve being controlled by a timing cam 99. The valve 94, as shown in Figure 13, is held up by a spring 95 operating through a bell crank lever 96 fulcrumed at 97 and bearing against a pin 98 movable vertically in the end of the valve casing. The timing cam 99 is mounted on a continuously rotating shaft 100, and is adapted to swing the bell crank 96 about its fulcrum to release the pin 98 and thereby permit a spring 102 to move the valve 94 downward and hold it in its lowered position, except during the brief interval required to operate the shears. When the valve is up, as shown in Figure 13, air under pressure is admitted from the pressure pipes 92, 101, through a port 104 above the valve and from thence to a port 105 to which is connected a pipe 103 communicating through an air channel 106 with the motor cylinder behind the piston 88. The air under pressure drives the piston forward and operates the shear blades to closed position. The cam 99 now operates as above described to lower the valve, thereby closing the passage between the ports 104 and 105. The air pressure behind the motor piston is thereby relieved, as the port 105 is now open to the atmosphere through the lower end of the valve casing 93. The motor piston 88 is now driven to the right by means of air pressure in the annular chamber 107 which pressure is applied to the surface 108 of the piston. It will be noted that air pressure is maintained at all times within the chamber 107, but the area of the surface 108 is only a fraction of the surface behind the piston, so that when air is admitted to the latter surface the piston is driven forward. The cam 99, as shown in Figure 13, comprises adjustable sections permitting the timing of the opening and closing movements of the shears to be independently adjusted.

The cutting edges 109 and 110 of the shear blades, as shown in Figures 19 and 21, are arranged at such an angle with respect to the movements of the shears that they will contact with the cylindrical column of glass simultaneously at four equally distant points circumferentially of the glass. It will also be noted that each of the four cutting edges cuts into the glass or moves toward the center of the column at the same speed. The purpose of this arrangement is to secure in the use of pivoted shears, a uniform and symmetrical cutting action of the shears upon the glass and to prevent the gob from being forced to one side by the shears.

The feeder mechanism is driven from a power shaft 111 (Fig. 1) which is connected to or driven in synchonism with the machine to which the gobs are fed. Said machine may comprise a series of molds 112 carried by a mold table 113 which is rotated to bring the molds successively beneath the discharge orifice to receive the gobs or charges 114. The drive shaft 111, which makes one complete rotation during the formation of each gob, is connected through a universal joint 115 to a vertical shaft 116 which carries a spiral gear 117 (Fig. 10) running in mesh with a spiral gear 118 on the horizontal shaft 100. A sprocket wheel 119 on the shaft 100 drives a sprocket chain 120 extending upwardly therefrom and driving a sprocket wheel 122 on a shaft 123 on which is mounted the plunger operating cam 47.

In order to permit an adjustment in the timing of the plunger and cutter relative to the movements of the molds, an adjusting device shown in Figures 1 to 4 is provided between the drive shaft 111 and the shaft 116. This device comprises two members 124 and 125 relatively adjustable rotatively on the shaft 111. The member 124 is connected to rotate with the shaft 111 by a feather key 126. Attached to the member 124 is a ring 127 which engages a groove in the member 125 to prevent relative movement of the latter lengthwise of the shaft. The parts 124 and 125 are provided respectively with lugs 128 and 129 (Fig. 3) in each of which is mounted a bearing block 130. These blocks are swiveled on stud screws 132. An adjusting rod 133 is formed with right and left hand screw threads which work in correspondingly threaded openings in the bearing blocks 130. A hand wheel 134 permits rotation of the rod 133, thereby rotatively adjusting the shaft 116 relative to the shaft 111. The operation of the feeder may thereby be accurately timed to the movements of the molds. A lock nut 135 holds the rod 133 in its adjusted position. A pointer 136 on the member 125 moves over graduations 137 on the ring 127 and thereby indicates the adjustment.

Referring to Figures 9 and 10, means are provided for adjusting the time at which the shear mechanism is operated relative to the operation of the plunger. For the purpose of such adjustment the sprocket wheel 119 is mounted for rotative adjustment on the shaft 100. An adjusting block 146 is keyed to the shaft. Adjusting screws 147 threaded in said block bear at their lower ends against a bearing block 138 fixed to the sprocket wheel. By adjusting one of the screws 147 upward and the other downward, the sprocket 119 is rotatively adjusted on its shaft. In this way an earlier or later operation of the plunger relative to the operation of the shears, may be effected.

Modifications may be resorted to within the spirit and scope of my invention.

What I claim is:

1. In an apparatus for delivering charges of molten glass, the combination of a container for the glass having an outlet opening in the bottom thereof, a regulating plug projecting downward into the glass over said opening, a horizontal yoke carrying said plug, a member extending lengthwise of the yoke and having a connection at one end with one end of the yoke, a manually adjustable connection between the yoke and said member at their opposite ends, and a driving element connected to said member for moving the plug up and down.

2. In an apparatus for delivering charges of molten glass, the combination of a container for the glass having an outlet opening in the bottom thereof, a regulating plug projecting downward into the glass over said opening, a horizontal yoke carrying said plug, a bar extending lengthwise of the yoke and having a pivotal connection therewith at one end, an adjustable connection between the other end of said bar and yoke by which the bar and yoke may be adjusted toward and from each other, and a driving member connected to said bar and movable up and down for reciprocating the plug.

3. In an apparatus for delivering charges of molten glass, the combination of a container for the glass having an outlet opening in the bottom thereof, a regulating plug projecting downward into the glass over said opening, a horizontal yoke carrying said plug, a bar extending lengthwise of the yoke and having a pivotal connection therewith at one end, an adjustable connection between the other end of the said bar and yoke by which the bar and yoke may be adjusted toward and from each other, a driving member connected to said bar and movable up and down for reciprocating the plug, said connection comprising a screw rod swiveled in the yoke, and an operating rod having a universal joint connection to said screw rod.

4. In an apparatus for delivering charges of molten glass, the combination of a container for the glass, said container having a discharge opening through which the glass issues, a controlling device extending into the glass, means for reciprocating said controlling device toward and from the said opening, including a cam, said cam comprising sections operable to move said device by a series of steps in one direction, and means for adjusting said sections to adjust the relative timing of said step movements.

5. In an apparatus for delivering charges of molten glass, the combination of a container for the glass, said container having a discharge opening through which the glass issues, a controlling device extending into the glass, means for reciprocating said controlling device toward and from the said opening, including a cam, said cam comprising sections shaped to cause a movement of said device by a series of steps in one direction and also to control the movement of said device in the opposite direction, and means for adjusting the cam sections to adjust the timing of the several movements and the length of the intervals between such movements.

6. In a feeder for molten glass, the combination of a reciprocating plunger, a drive shaft, mechanism between the drive shaft and plunger for reciprocating the latter once during each complete rotation of the drive shaft, adjusting means between the drive shaft and said mechanism by which the timing of the plunger relative to the drive shaft may be effected, said adjusting means comprising a part mounted to rotate with the drive shaft, and a part connected to rotate with said mechanism, and an adjusting rod forming a driving connection between said parts, said rod having right and left hand screw connections with said parts and operable to rotate one part relatively to the other.

Signed at Toledo, in the county of Lucas and State of Ohio, this 21st day of February, 1921.

ALBERT N. CRAMER.